US012693022B2

(12) United States Patent (10) Patent No.: US 12,693,022 B2
Stoltzfus et al. (45) Date of Patent: Jul. 28, 2026

(54) PORTABLE FIRE PIT

(71) Applicant: Breeo, LLC, Kinzers, PA (US)

(72) Inventors: Amos A. Stoltzfus, Gordonville, PA (US); Jonathan C. Miller, New Providence, PA (US); Christopher Boehmer, Shohola, PA (US)

(73) Assignee: Breeo, LLC, Kinzers, PA (US)

( * ) Notice: Subject to any disclaimer, the term of this patent is extended or adjusted under 35 U.S.C. 154(b) by 358 days.

(21) Appl. No.: 18/360,362

(22) Filed: Jul. 27, 2023

(65) Prior Publication Data

US 2024/0035662 A1 Feb. 1, 2024

Related U.S. Application Data

(60) Provisional application No. 63/393,145, filed on Jul. 28, 2022.

(51) Int. Cl.
*F24B 3/00* (2006.01)
*A47J 37/07* (2006.01)

(52) U.S. Cl.
CPC ................ *F24B 3/00* (2013.01); *A47J 37/07* (2013.01); *A47J 2037/0777* (2013.01)

(58) Field of Classification Search
CPC ..... A47J 37/07; A47J 2037/0777; F24B 3/00; F24B 1/181; F24B 1/022
See application file for complete search history.

(56) References Cited

U.S. PATENT DOCUMENTS

| | | |
|---|---|---|
| 1,996,349 A | 4/1935 | Ross |
| 2,210,720 A | 8/1940 | Johnson et al. |

| | | | |
|---|---|---|---|
| 2,419,379 A | 4/1947 | Tindell, Jr. | |
| 2,473,569 A * | 6/1949 | Cast ........................ | F24B 1/205 |
| | | | 126/154 |
| 2,604,884 A | 7/1952 | Walker | |
| D186,487 S | 10/1959 | Brooks | |
| D191,186 S | 8/1961 | Maki | |
| 3,220,400 A | 11/1965 | Yager | |
| D204,348 S | 4/1966 | Shilling | |

(Continued)

FOREIGN PATENT DOCUMENTS

| | | |
|---|---|---|
| DE | 10236945 A1 | 3/2004 |
| WO | 2010029567 A2 | 3/2010 |

OTHER PUBLICATIONS

Jan. 19, 2011 Fire Pit w/ Kettle Winch publication, Beaver Creek Furniture.

(Continued)

*Primary Examiner* — Alfred Basichas

(74) *Attorney, Agent, or Firm* — Fred Zollinger

(57) ABSTRACT

A portable fire pit includes adjustable height telescoping legs that provide a cooking height, a campfire height, and a storage height. When in the storage position, a majority of the lower leg portions are disposed alongside the sidewall or intermediate the upper flange and the bottom of the fire pit to provide a compact profile to the fire pit for carrying and storage. The fire pit includes a handle that allows a person to carry the fire pit with a single arm at the user's side. When the legs of the fire pit are in the storage position, a user can pick up the fire pit by the handle and place it in a vehicle or trailer for use in a different location. An airflow cone is provided above the fire box with an angled wall.

18 Claims, 11 Drawing Sheets

(56) References Cited

U.S. PATENT DOCUMENTS

| | | | |
|---|---|---|---|
| 3,458,895 A | 8/1969 | Miller, II | |
| 3,742,839 A | 7/1973 | Maley | |
| 3,765,397 A | 10/1973 | Henderson | |
| 3,868,943 A | 3/1975 | Hottenroth et al. | |
| 3,982,522 A | 9/1976 | Hottenroth et al. | |
| D263,918 S | 4/1982 | Boyd | |
| D264,541 S | 5/1982 | Bruveris | |
| 4,471,751 A | 9/1984 | Hottenroth et al. | |
| 4,548,193 A | 10/1985 | Marogil | |
| 4,667,651 A | 5/1987 | Groeneweg | |
| 4,732,138 A | 3/1988 | Vos | |
| 4,762,114 A | 8/1988 | Blankemeyer | |
| 4,813,308 A | 3/1989 | Petrus | |
| D315,846 S | 4/1991 | Hatzenbeller | |
| 5,094,223 A | 3/1992 | Gonzalez | |
| D327,602 S | 7/1992 | Walker | |
| 5,133,266 A | 7/1992 | Cullen | |
| D335,811 S | 5/1993 | Bengtson et al. | |
| D342,184 S | 12/1993 | Sanchez | |
| D344,207 S | 2/1994 | Bauman | |
| D349,024 S | 7/1994 | Doffee | |
| D369,939 S | 5/1996 | Gibbs | |
| 5,572,983 A | 11/1996 | Schlosser et al. | |
| 5,596,980 A | 1/1997 | Whalen et al. | |
| D382,765 S | 8/1997 | Kellermann | |
| D390,935 S | 2/1998 | Bosje et al. | |
| 5,797,386 A | 8/1998 | Orr | |
| 5,832,915 A | 11/1998 | Skidmore et al. | |
| 5,842,463 A | 12/1998 | Hall | |
| 5,862,742 A | 1/1999 | Bjerg | |
| 5,873,356 A | 2/1999 | Vossler et al. | |
| 6,070,571 A | 6/2000 | Bradbury | |
| D440,638 S | 4/2001 | Lefroy-Brooks | |
| 6,289,795 B1 | 9/2001 | McLemore et al. | |
| 6,298,843 B1 | 10/2001 | Olsen et al. | |
| 6,336,449 B1 | 1/2002 | Drisdelle et al. | |
| 6,354,288 B1 | 3/2002 | McDonald | |
| D457,029 S | 5/2002 | Wickizer | |
| 6,386,192 B1 | 5/2002 | Weber | |
| 6,578,568 B1 | 6/2003 | Dufort et al. | |
| 6,845,705 B1 | 1/2005 | Chen | |
| 7,007,687 B2 | 3/2006 | Lewis | |
| 7,063,006 B1 | 6/2006 | Spehle et al. | |
| D563,144 S | 3/2008 | Melzer et al. | |
| 7,383,836 B2 | 6/2008 | Klemming | |
| D577,946 S | 10/2008 | Carroll | |
| D582,197 S | 12/2008 | Parmelee | |
| D592,443 S | 5/2009 | Fraser | |
| D624,350 S | 9/2010 | Wu | |
| 8,272,601 B2 | 9/2012 | Kocher | |
| D679,791 S | 4/2013 | Lowsky | |
| D690,405 S | 9/2013 | Lowsky | |
| D701,721 S | 4/2014 | Jan | |
| D715,611 S | 10/2014 | Stamm et al. | |
| 8,893,703 B2 | 11/2014 | DeFoort et al. | |
| D724,714 S | 3/2015 | Benson et al. | |
| 8,991,382 B1 | 3/2015 | Mau | |
| D726,235 S | 4/2015 | Nauli | |
| D734,975 S | 7/2015 | Troyer, Jr. | |
| 9,215,950 B2 | 12/2015 | Walker | |
| D774,172 S | 12/2016 | Zemel et al. | |
| D780,897 S | 3/2017 | Weng | |
| D790,677 S | 6/2017 | Horsfield | |
| D792,567 S | 7/2017 | Zemel et al. | |
| D796,655 S | 9/2017 | Horne, III | |
| 9,763,539 B2 | 9/2017 | Robles | |
| D801,495 S | 10/2017 | Home, III | |
| D812,957 S | 3/2018 | McGuinness | |
| 10,098,502 B2 | 10/2018 | Ohler et al. | |
| 10,130,212 B2 | 11/2018 | Lopez | |
| 10,219,653 B1 * | 3/2019 | Ruiz | A47J 37/0763 |
| 10,222,092 B1 | 3/2019 | Traeger | |
| D845,455 S | 4/2019 | Horsfield | |
| D858,729 S | 9/2019 | Scott | |
| 10,473,334 B2 | 11/2019 | Crosen | |
| 10,517,428 B2 | 12/2019 | Marlett | |
| D877,553 S | 3/2020 | Jordan | |
| 10,588,455 B2 | 3/2020 | Horne, III | |
| 10,888,195 B1 | 1/2021 | Norris et al. | |
| D914,172 S | 3/2021 | Stoltzfus | |
| D917,682 S | 4/2021 | Stoltzfus | |
| D918,357 S | 5/2021 | Stoltzfus | |
| D918,358 S | 5/2021 | Stoltzfus | |
| D919,777 S | 5/2021 | Stoltzfus | |
| D927,659 S | 8/2021 | Stoltzfus | |
| D954,921 S | 6/2022 | Stoltzfus et al. | |
| D956,193 S | 6/2022 | Stoltzfus | |
| D961,321 S | 8/2022 | Lam | |
| 11,585,534 B2 | 2/2023 | Stoltzfus et al. | |
| 11,668,468 B2 * | 6/2023 | Kim | F24B 1/195 |
| | | | 126/9 B |
| 11,841,142 B2 | 12/2023 | Koehler | |
| 11,846,428 B1 | 12/2023 | Cantelar | |
| 2002/0040644 A1 | 4/2002 | McLemore et al. | |
| 2004/0055590 A1 | 3/2004 | Warnick et al. | |
| 2006/0236996 A1 | 10/2006 | Mosher, II et al. | |
| 2007/0017500 A1 | 1/2007 | Chen | |
| 2007/0137634 A1 | 6/2007 | Traeger et al. | |
| 2007/0272229 A1 | 11/2007 | Becker et al. | |
| 2007/0289587 A1 | 12/2007 | Eckes | |
| 2008/0105252 A1 | 5/2008 | Barbour et al. | |
| 2010/0258106 A1 | 10/2010 | Simms, II | |
| 2011/0073098 A1 | 3/2011 | Chang | |
| 2012/0145139 A1 | 6/2012 | Deeds | |
| 2012/0196232 A1 | 8/2012 | Miller | |
| 2012/0312297 A1 | 12/2012 | Walker | |
| 2014/0238378 A1 * | 8/2014 | Scott | F24B 1/181 |
| | | | 126/55 |
| 2014/0338585 A1 | 11/2014 | McBride et al. | |
| 2015/0034066 A1 * | 2/2015 | Plott | A47J 37/0713 |
| | | | 126/25 R |
| 2015/0075514 A1 | 3/2015 | Kuenzinger | |
| 2015/0136112 A1 | 5/2015 | Dyson | |
| 2015/0201804 A1 | 7/2015 | Liao | |
| 2015/0267919 A1 | 9/2015 | Zemel et al. | |
| 2015/0285507 A1 | 10/2015 | Troyer, Jr. | |
| 2015/0305561 A1 | 10/2015 | Andol | |
| 2016/0029841 A1 | 2/2016 | Walker | |
| 2016/0166109 A1 | 6/2016 | Banal et al. | |
| 2017/0303741 A1 | 10/2017 | Horne, III | |
| 2018/0184840 A1 | 7/2018 | Maga | |
| 2019/0137107 A1 | 5/2019 | Crosen | |
| 2019/0159630 A1 | 5/2019 | Salum | |
| 2020/0077840 A1 | 3/2020 | White | |
| 2020/0096199 A1 | 3/2020 | Harrington et al. | |
| 2020/0352379 A1 | 11/2020 | Fiveash | |
| 2020/0370753 A1 | 11/2020 | Goin | |
| 2021/0018180 A1 | 1/2021 | Jan et al. | |
| 2021/0045578 A1 | 2/2021 | Stoltzfus | |
| 2021/0048188 A1 | 2/2021 | Harrington et al. | |
| 2021/0156565 A1 | 5/2021 | Skillman | |
| 2021/0404663 A1 | 12/2021 | Strange | |
| 2023/0044096 A1 | 2/2023 | Koehler | |

OTHER PUBLICATIONS

Admitted prior art, printed from https://breeo.co Aug. 15, 2019; breeo Smokeless Fire Pits, Luxeve.

Admitted prior art, Breeo, LLC, Double Flame 17" Grill & Post, downloaded on Sep. 4, 2019 from https://breeo.co/collections/double-flame/products/double-flame-17-grill-post.

Admitted prior art, Breeo, LLC, Double Flame 19" Smokeless Fire Pit, downloaded on Sep. 4, 2019 from https://breeo.co/collections/double-flame/products/double-flame-19-fire-pit-stainless.

Admitted prior art, Breeo, LLC, Double Flame 24" Smokeless Fire Pit—Steel, downloaded on Sep. 4, 2019 from https://breeo.co/collections/double-flame/products/double-flame-24-fire-pit-steel.

Admitted prior art, Breeo, LLC, Double Flame 24" Smokeless Fire Pit—Stainless, downloaded on Sep. 4, 2019 from https://breeo.co/collections/double-flame/products/double-flame-24-fire-pit-stainless.

Admitted prior art, Breeo, LLC, Double Flame 24" Double Flame 24" Grill & Post, downloaded on Sep. 4, 2019 from https://breeo.co/collections/double-flame/products/double-flame-24-grill-post.

(56) References Cited

OTHER PUBLICATIONS

Breeo, LLC, Phoenix, downloaded on Sep. 4, 2019 from https://breeo.co/collections/phoenix.

Yardcraft, The Forge Smokeless Fire Pit, accessed Apr. 22, 2021, printed May 11, 2021, from www.yardcraft.com/product/fire-pits/urban-fire-collection/the-forge-smokeless-fire-pit/.

US Patent 613,781, Nov. 8, 1898, Schneider.

\* cited by examiner

PORTABLE FIRE PIT

CROSS REFERENCE TO RELATED APPLICATIONS

This application claims the benefit of U.S. Provisional Patent Application No. 63/393,145 filed Jul. 28, 2022, the disclosures of which are incorporated herein by reference.

BACKGROUND OF THE DISCLOSURE

1. Technical Field

The disclosure generally relates to devices used to contain fires. More particularly, the disclosure relates to an outdoor fire containment device commonly known as a fire pit that is movable from place to place.

2. Background Information

People enjoy burning small campfires in their backyards and while camping. These fires are used for general enjoyment and for cooking. One drawback with a backyard campfire—especially one made from a soft wood or a wood containing water—is the smoke generated from the fire. The smoke can infiltrate the owner's house and neighbors' houses. This problem has led some cities and communities to completely ban backyard campfires. A popular fire pit configuration has an airflow chamber between the exterior walls of the main body wherein air is heated before being introduced at the top of the fire box. This helps to reduce the amount of smoke produced by the fire.

Another issue is that some backyard fire pits are built into the landscape, patio, or deck and cannot be used in different locations. Some movable fire pits are heavy and difficult to simply pick up and take to different locations. Further, those that can be picked up and moved consume limited packing space in a vehicle when the legs of the fire pit are attached and extended. This limits the desirability of traveling with such a fire pit.

SUMMARY OF THE DISCLOSURE

The disclosure provides a fire pit that is designed to be portable. The fire pit includes adjustable height legs that provide defined extended positions at a cooking height and a campfire height with the legs also having a storage position. In the exemplary configuration, the lower portions of the legs retract up into upper leg portions in the storage position and have portions of both located between the inner and outer sidewalls of the fire pit. When in the storage position, a majority of the lower leg portions are located alongside the sidewall or intermediate the upper flange and the bottom of the fire pit to provide a compact profile to the fire pit for carrying and storage. The fire pit includes a handle that allows a person to carry the fire pit with a single arm at the user's side. When the legs of the fire pit are in the storage position, a user can pick up the fire pit by the handle and place it in a vehicle or trailer for use in a different location. In the exemplary configuration, the handle can be pivoted to a storage position. The handle is located at the middle portion of the fire pit and can be aligned with the center of gravity so that the fire pit is balanced when carried by the handle.

The disclosure provides a fire pit having three legs that provide stable support on a variety of surfaces. In the exemplary configuration, the legs are angled outwardly to increase stability. In the cooking position, the lower leg portions can be pivoted outwardly to increase stability.

The disclosure provides a fire pit with a heat shield spaced below the bottom wall of the fire box to protect the support surface from the heat generated by the fire pit. The heat shield defines lower air inlets for the fire box. In the exemplary configuration, the lower air inlets are defined only by the outer radial portion of the heat shield to limit the amount of heat delivered to the support surface. This configuration allows the fire pit to be used on deck surfaces. In the exemplary configuration, the outer sidewall also defines lateral air inlets for the fire box and the airflow channel.

The exemplary configuration of the fire pit provides an outer airflow channel that delivers air through upper air outlet openings to the top of the fire box to reduce the amount of smoke produced by the fire pit. The exemplary configuration includes a flange that overhangs the outer perimeter of the fire box. An angled wall located above the upper air outlets and extending to the inner edge of the flange defines an air cone that directs rising air in the fire box inwardly.

The disclosure provides a raised air inlet manifold at the bottom of the fire box. The air inlet manifold receives air through the bottom wall of the fire box through elongated openings that match the shape of the arms. The arms also open to the hollow legs through the inner sidewall where air can enter the arms. The arms of the air inlet manifold connect with the upper leg portions to increase the structural stability of the fire pit.

The disclosure provides a fire pit that accepts a grill post that supports a grill and a kettle hook.

The individual features may be combined in different combinations than specifically described below to form different configurations of the device of the disclosure. The preceding non-limiting aspects of the disclosure, as well as others, are more particularly described below. A more complete understanding of the devices, assemblies, and methods can be obtained by reference to the accompanying drawings, which are not intended to indicate relative size and dimensions of the assemblies. In those drawings and the description below, like numeric designations refer to components of like function. Specific terms used in that description are intended to refer only to the particular structure of the embodiments selected for illustration in the drawings and are not intended to define or limit the scope of the disclosure.

DETAILED DESCRIPTION OF THE DISCLOSURE

Figure 1:
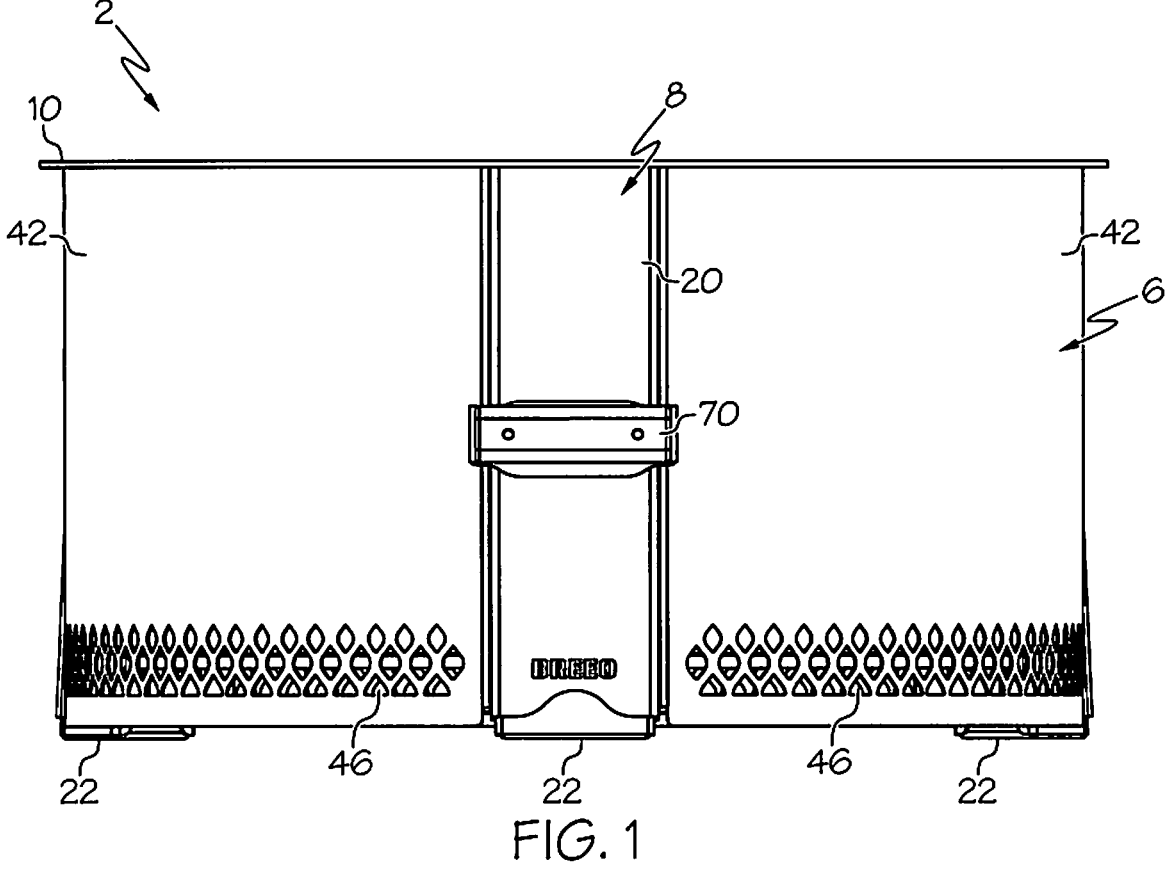
FIG. 1 is a front elevation view of an exemplary configuration of the fire pit with the legs in the storage position.

This description of exemplary embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "joined," "connected," and "interconnected," refer to a relationship wherein structures are secured or attached to one another either directly or indirectly through intervening structures, as well as both movable or rigid attachments or relationships, unless expressly described otherwise.

Figure 8:
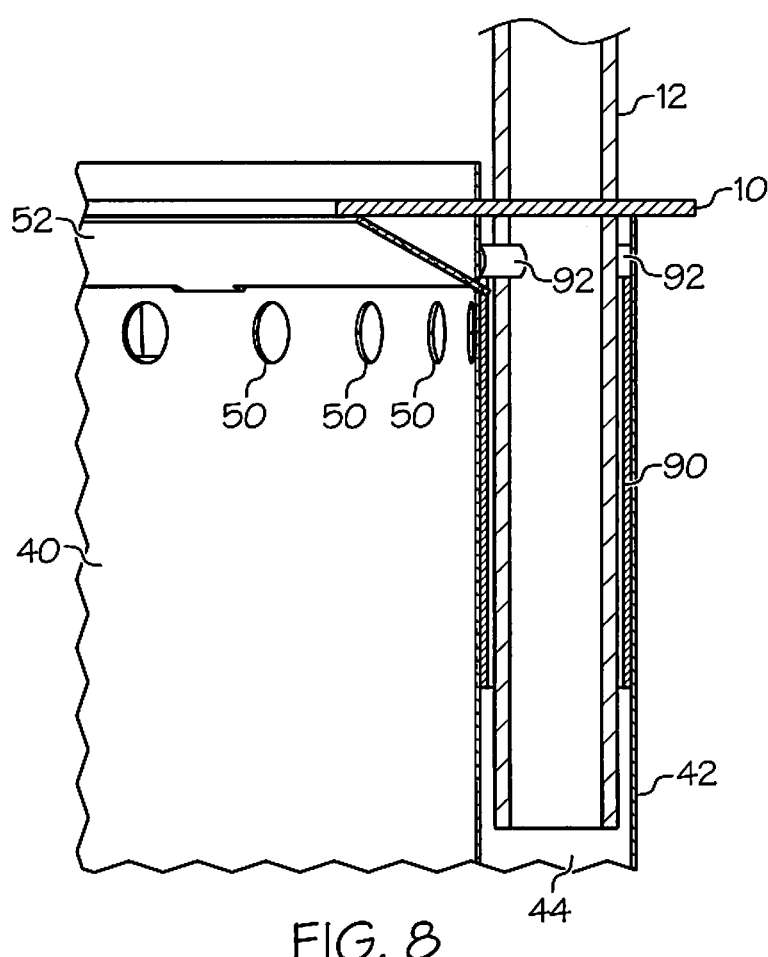
FIG. 8 is an enlarged section view showing the grill post holder.
Figure 9:
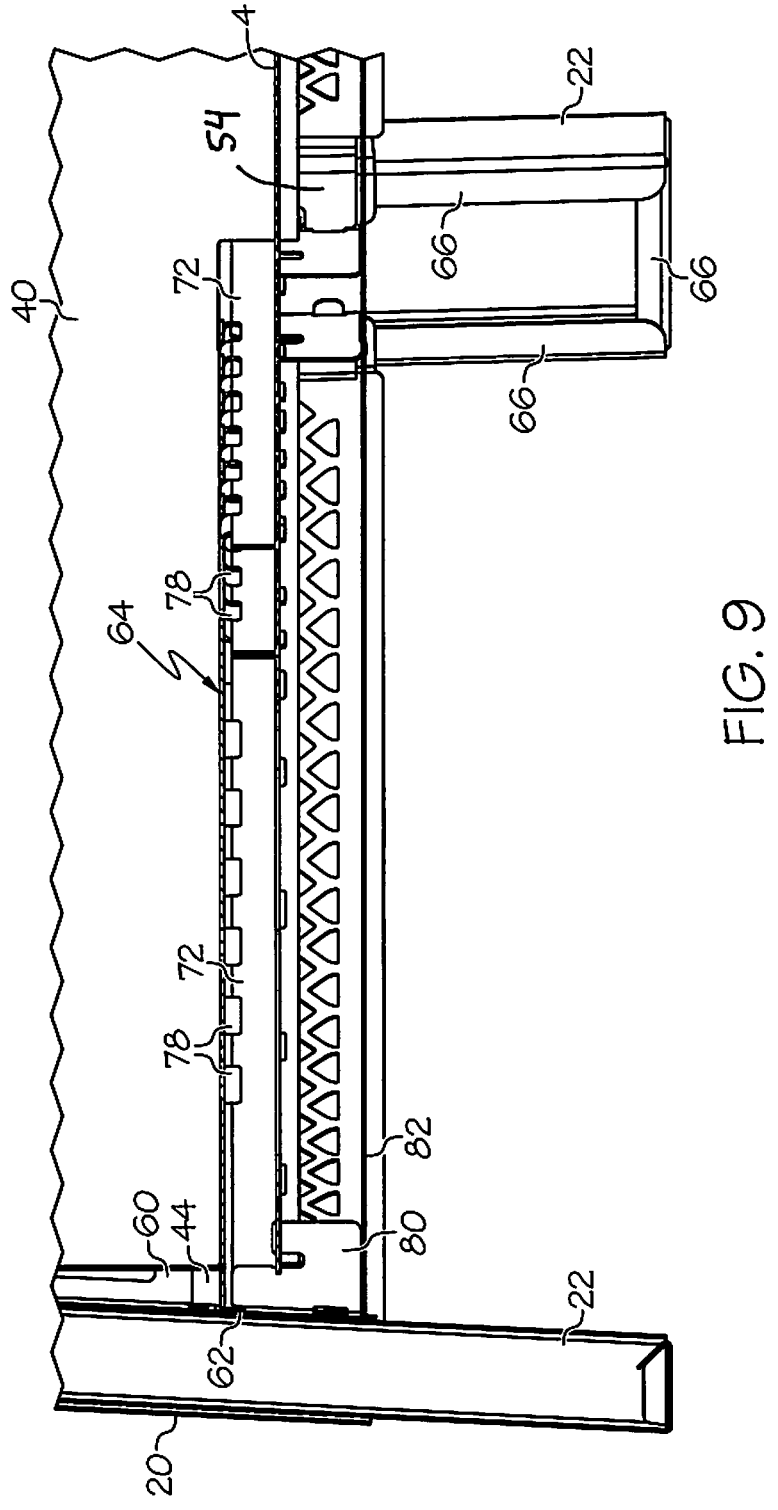
FIG. 9 is a section view taken through one of the arms of the air inlet manifold.
Figure 10:
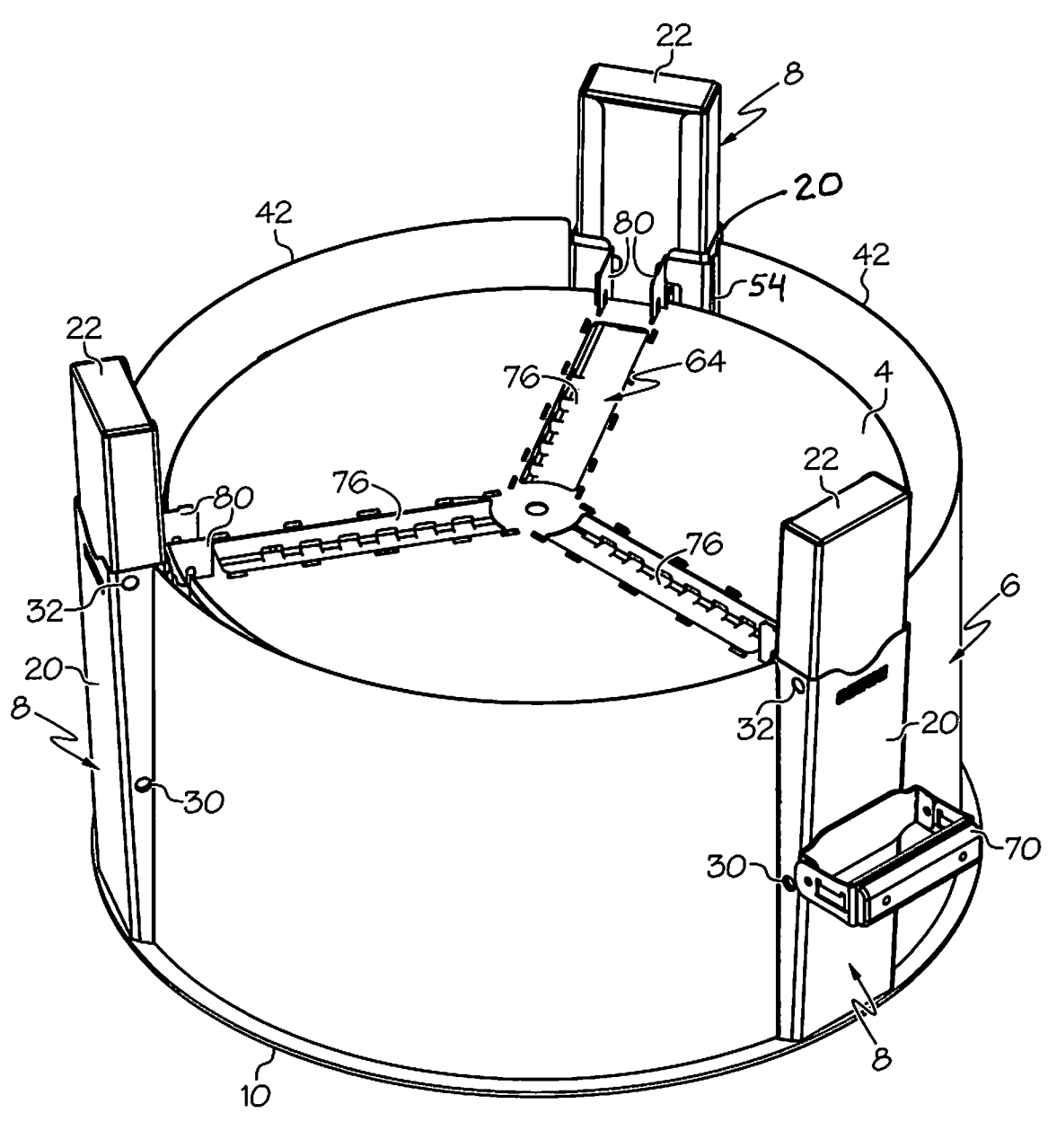
FIG. 10 is a perspective view of the bottom of the fire pit with the heat shield and sidewall openings removed.
Figure 11:
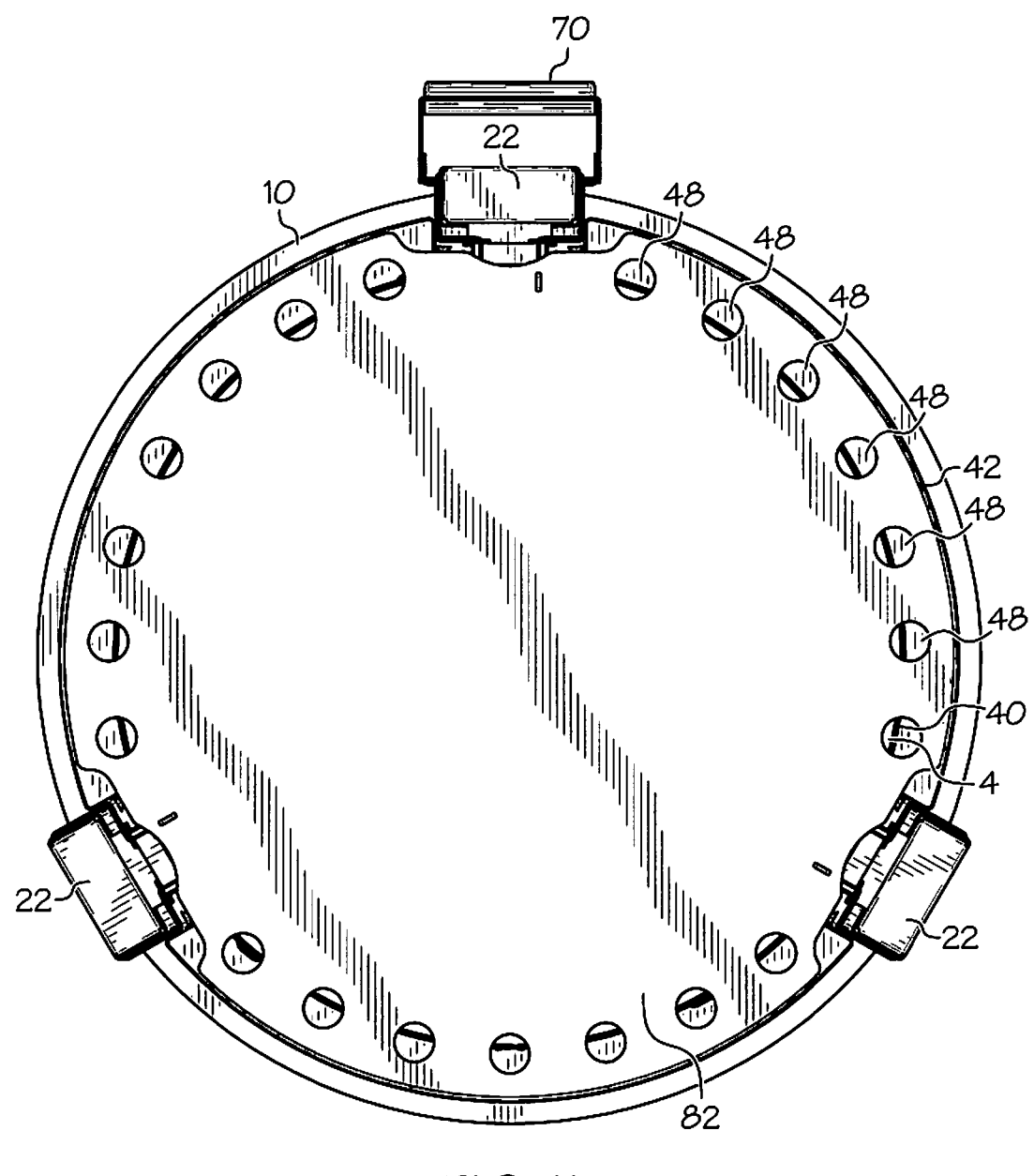
FIG. 11 is a bottom plan view.

An exemplary configuration of a portable fire pit device of the disclosure is indicated generally by the reference numeral 2 in the accompanying drawings. Fire pit 2 generally includes a fire box that is defined by a bottom wall 4 and a sidewall 6. The fire box receives fuel such as wood, pellets, or other combustible materials that will be burned when the fire pit is used. Fire pit 2 also includes a plurality of adjustable-length, selectively telescoping legs 8. Fire pit 2 further includes a ring-shaped flange 10 disposed about the top of sidewall 6. Flange 10 has an inner overhanging portion that overhangs the fire box. The outer portion of flange 10 extends outwardly from the top edge of sidewall 6 to define an outer overhang. The upper surface of flange 10 can function as a griddle that can be cooked upon. Optionally, fire pit 4 can removably receive a grill post 12 as shown in FIG. 8 that can be used to position a grill or other accessory above the fire box. Fire pit 2 provides a safe and convenient place for one to burn a small fire that can be used for cooking or general enjoyment. Fire pit 2 may be made from any of a variety of fire-resistant materials. The exemplary configuration of fire pit 2 is made from either steel or stainless steel.

Figure 2:
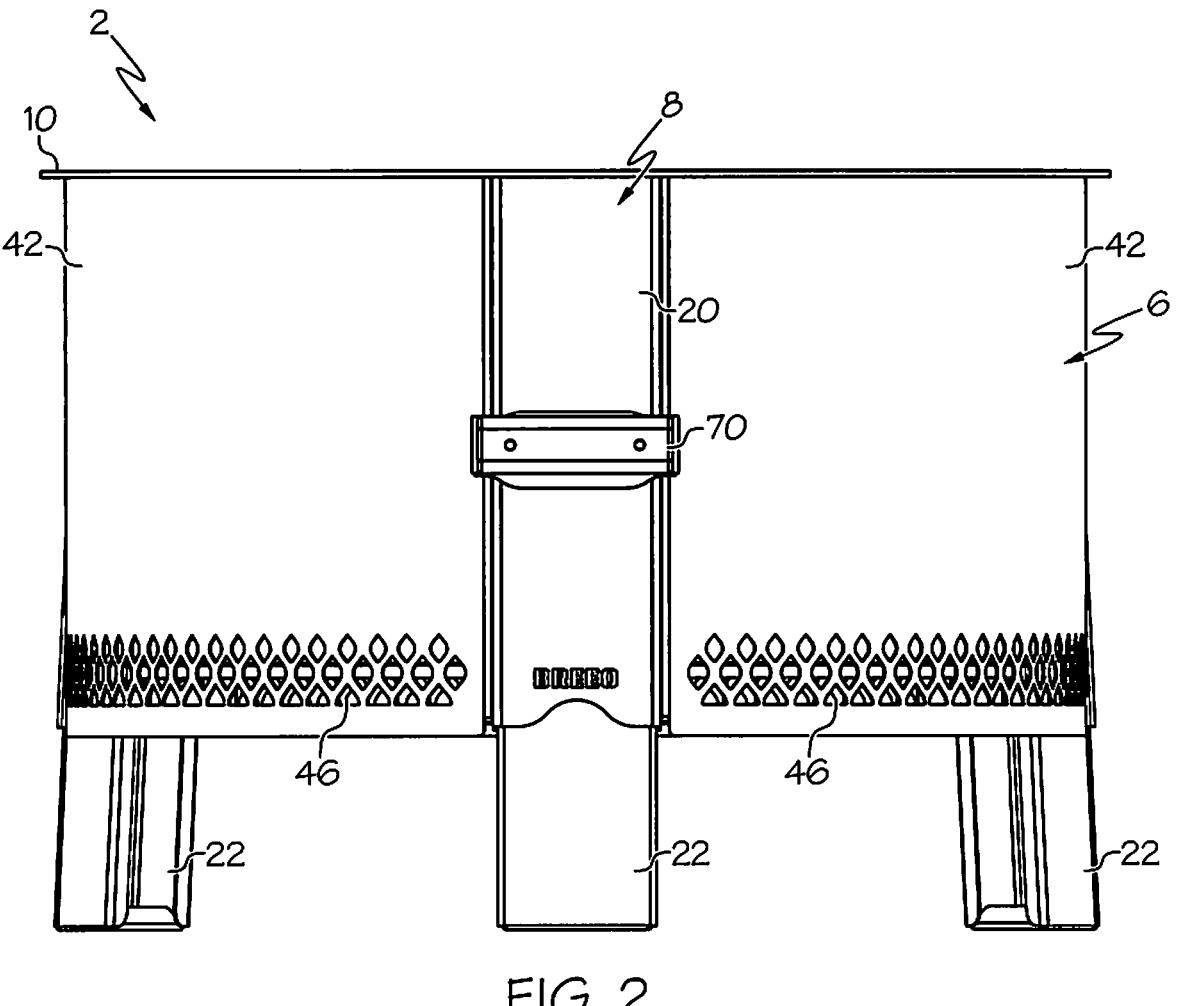
FIG. 2 is a front elevation view of the exemplary fire pit with the legs in the intermediate campfire position.
Figure 3:
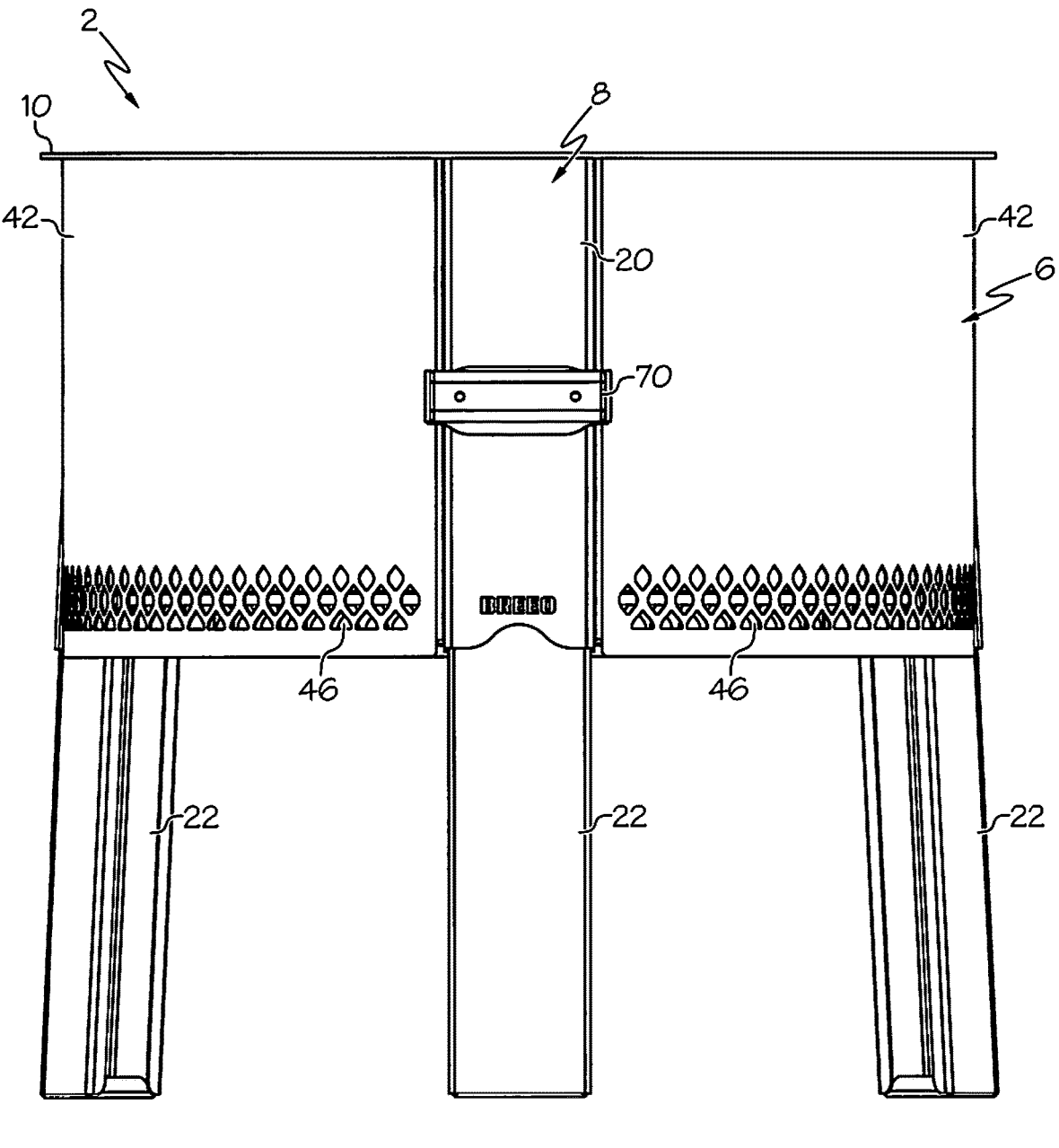
FIG. 3 is a front elevation view of the exemplary fire pit with the legs in the extended cooking position.

Each leg 8 includes an upper leg portion 20 and a lower leg portion 22 that selectively telescopes with respect to upper leg portion 20 to provide different leg positions for fire pit 2. In the exemplary configuration, upper leg portion 20 is on the outside and lower leg portion 22 slides inside upper leg portion 20. In an alternative configuration, upper leg portion is on the inside and lower leg portion 22 slides along the outside of upper leg portion 20. In the exemplary configuration, each leg 8 provides at least two defined positions where one or more locking fingers 24 holds the position of lower leg portion 22 with respect to upper leg portion 20. Another defined position is the storage position which is when at least a majority of lower leg portion 22 is located intermediate the position of flange 10 and the bottom of fire pit 2. In the exemplary configuration, lower leg portion 22 is almost entirely within upper leg portion 20 in the storage position with a majority of the lower leg portion 22 being intermediate flange 10 and the lower edge of sidewall 6. The three positions are the storage position depicted in FIG. 1, the campfire position of FIG. 2, and the cooking position of FIG. 3.

Figure 5:
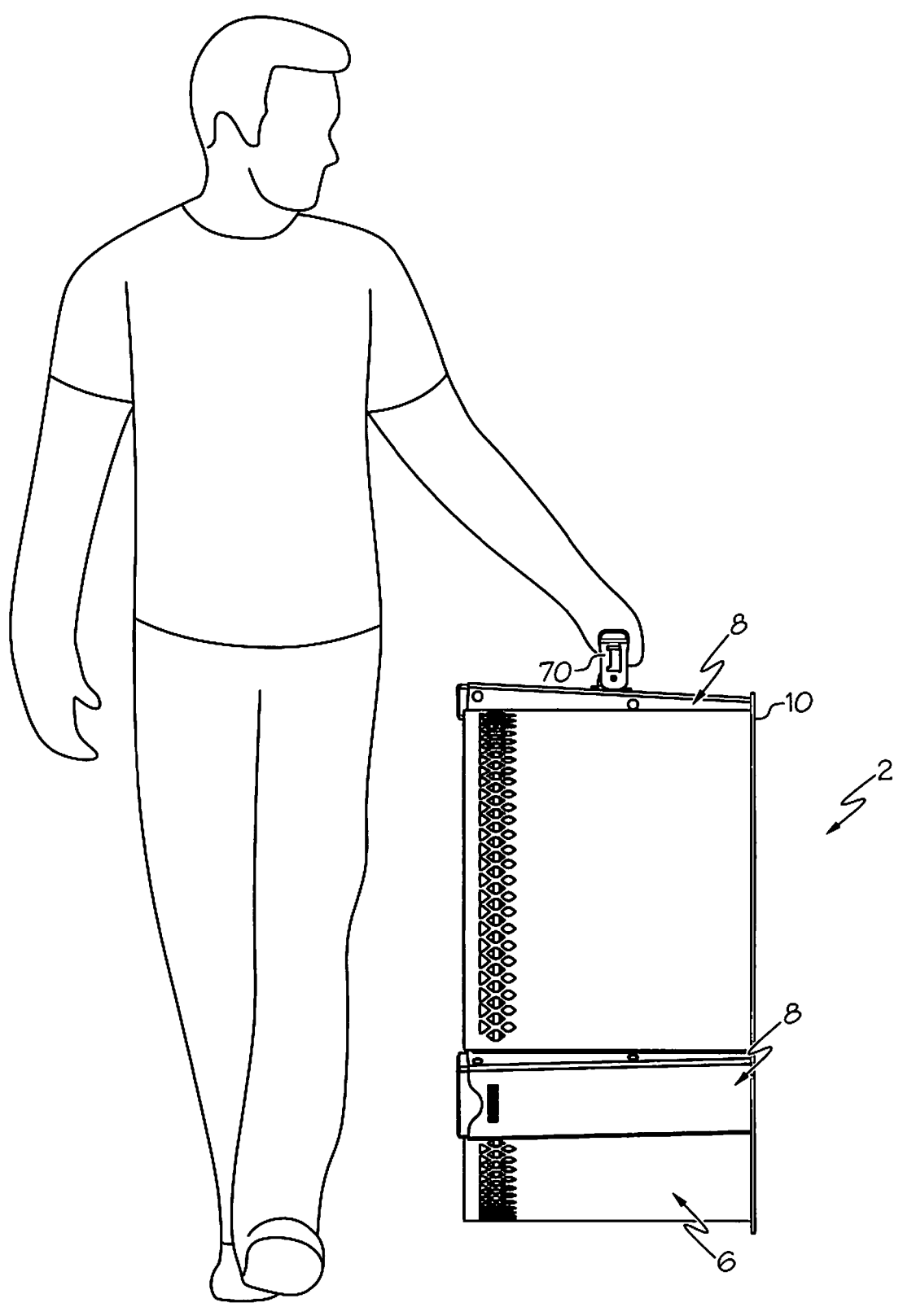
FIG. 5 is an elevation view showing a person carrying a balanced fire pit by the handle with the legs in the storage position.
Figure 6:
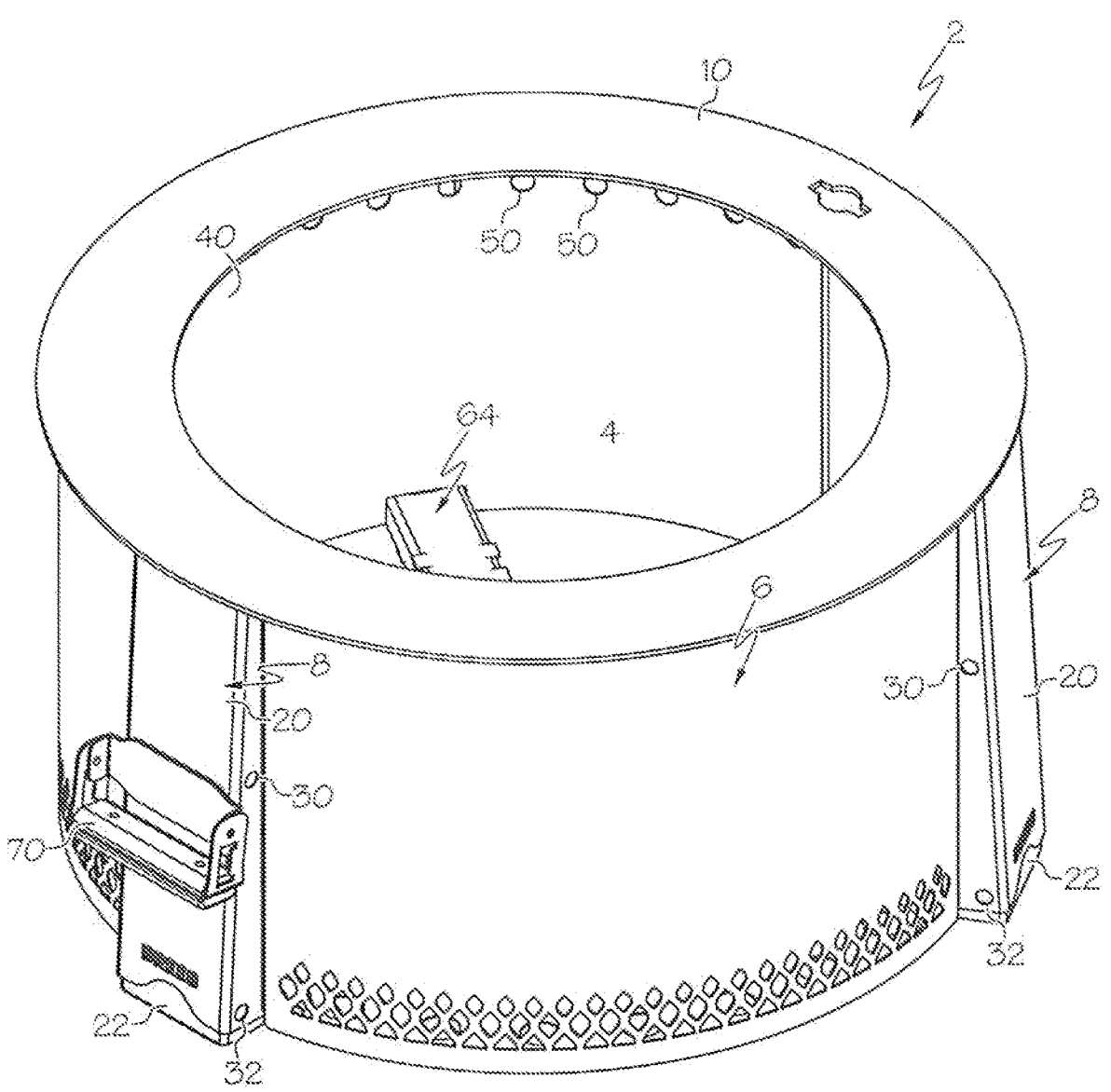
FIG. 6 is a perspective view of the fire pit with the legs in the storage position.
Figure 7:
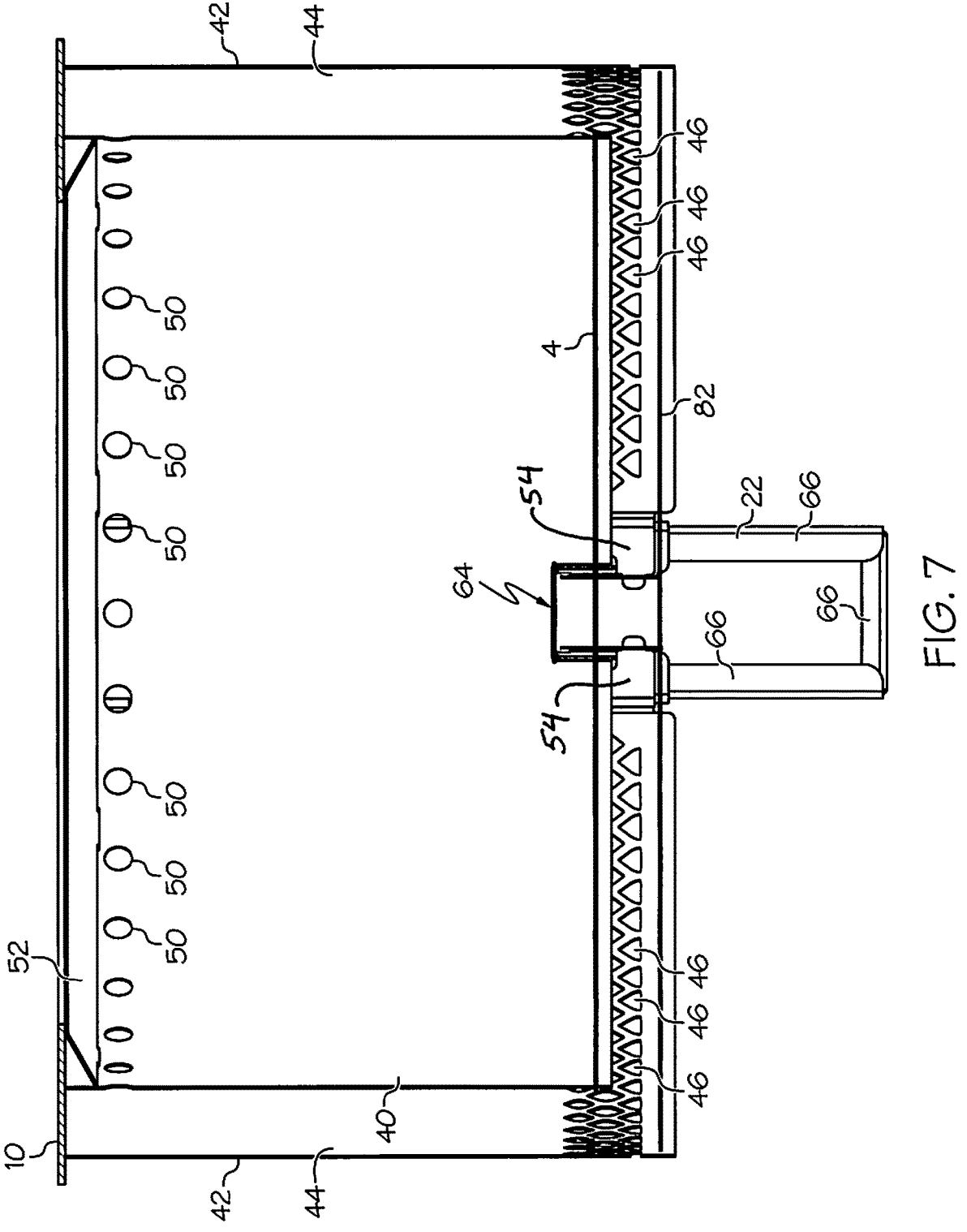
FIG. 7 is a section view taken through the center of the fire pit.

In the storage position, at least a majority of the length of inner leg portion 22 is located intermediate the upper and lower edges of sidewall 6 or intermediate flange 10 and the bottom of fire pit 2. In the storage position, essentially the entire length or the entire length of upper leg portion 20 is located intermediate the upper and lower edges of sidewall 6 or intermediate flange 10 and the bottom of fire pit 2. In the storage position, legs 8 (both upper leg portion 20 and lower leg portion 22) are located alongside sidewall 6. In the context of this description, legs 8 are "alongside" sidewall 6 when legs 8 are located laterally outwardly or against the outer surface or outer boundary of any component of sidewall 6, within the outer surface or outer boundary of sidewall 6, partially within the outer surface or outer boundary of sidewall 6, inwardly of the inner sidewall, or combinations of these locations. Legs 8 can be connected to sidewall 6 with a bracket that spaces legs 8 from sidewall 6 and legs 8 are alongside sidewall 6. In the exemplary configuration, FIGS. 5 and 6 show how legs 8 are angled partially with the boundaries of sidewall 6. In context of this application, a majority of lower leg portion 22 means more than fifty percent of its length. In the context of this application, the phrase "essentially the entire length" of lower leg portion 22 includes the configuration depicted in the drawings wherein less than ten percent of the length of inner leg portion 22 extends beyond the lower edge of sidewall 6 when leg 8 is in the storage position. In the exemplary configuration, less than 0.5 inches of inner leg portion 22 extends to a position lower than the lower edge of sidewall 6.

In the exemplary configuration, the campfire position locates flange 10 about (within twenty percent) fifteen inches above the support surface (ground, deck, support bricks, patio surface) with sidewall 6 being about ten to fourteen inches tall. At least about four inches of space is provided under fire pit 2 in the campfire position. Inner leg portions 22 extend at least about four inches below the lower edge of sidewall 6 to protect the support surface upon which fire pit 2 is standing from heat damage. Fire pit 2 is configured to be used on a deck surface with legs 8 in the campfire position without damaging the deck surface. In the cooking position, flange 10 is about twenty inches above the support surface with a majority of the length of lower leg portions 22 being extended from upper leg portions 20 to a position that is lower than the lower edge of sidewall 6.

When in the cooking position, each lower leg portion 22 can be pivoted outwardly a few degrees to a position where lower leg portion 22 is not parallel to upper leg portion 20. This increases the stability of fire pit 2. The outward pivot is possible when there is only a short length of lower leg portion 22 inside upper leg portion 20 and lower leg portion 22 can pivot on the lock fingers 34 described below.

Figure 4:
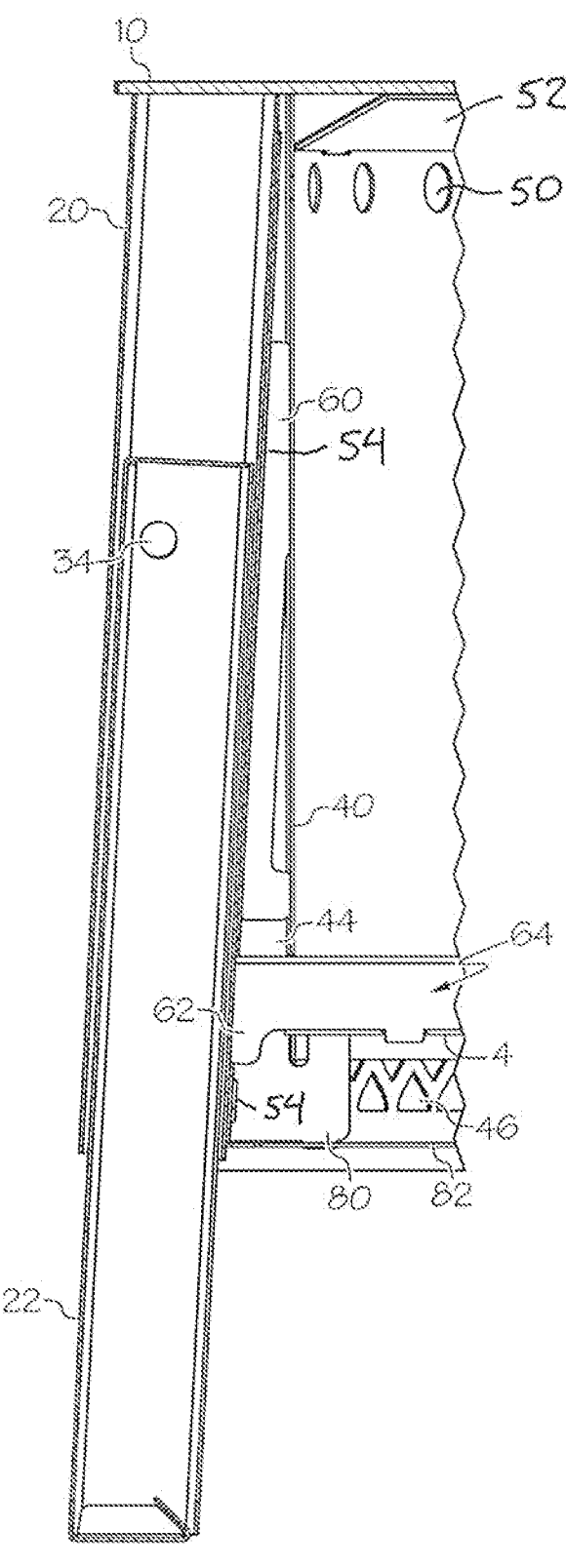
FIG. 4 is a section view taken through a leg and the sidewall.

As shown in FIG. 6, each outer leg portion 20 defines two sets of lock openings 30 and 32. Lock openings 30 are used for the campfire position and lock openings 32 are used for the cooking position. In the exemplary configuration, inner leg portions 22 are held in the storage position using friction (and the force of biased lock fingers 34 engaging the inner surface of upper leg portions 20). For the other two positions, biased lock fingers 34 (see FIG. 4) are carried by inner leg portions 22 in alignment with openings 30 and 32 and have portions that automatically move out into openings 30 or 32 when inner leg portion 22 is moved to a position that aligns locking fingers 34 with openings 30 or 32. Each lock finger 34 can include a biased integral section of metal that forces a tip of a lock finger member outwardly into openings 30 or 32. Lock finger 34 optionally can include a separate spring element that pushes a lock finger member outwardly. Biased lock fingers 34 can be biased locking ball plungers or spring button snap clips that are used to lock telescoping devices in defined positions. Optionally, outer leg portion 20 defines a third set of openings (like openings 30 and 32) for the storage position of the legs. A further option is for inner leg portion 22 to define openings in the locations of lock fingers 34 and for the user to insert a lock pin through the openings to fix the position of legs 8. Another option is for threaded clamps to be carried by outer leg portion 20 which include portions that extend through outer leg portion 20 to selectively engage inner leg portion 22. The user can tighten these clamps to lock the position of the legs 8.

Sidewall 6 includes an inner sidewall 40 and an outer sidewall 42 that are spaced apart to define an airflow channel 44 that extends up along the height of fire pit 2 to deliver air from air inlet openings 46 and 48 to upper air outlets 50 located near the top of inner sidewall 40 under flange 10. In the exemplary configuration, an angled wall 52 extends from inner sidewall 40 just above upper air outlet 50 to the inner edge of flange 10 or slightly inwardly spaced from the inner edge of flange 10 to define an airflow cone that directs air inwardly from air flow moving upwardly just inside inner sidewall 40. Airflow cone 52 also directs flames inwardly to provide more flames in the center of fire pit 2. Airflow cone 52 thus helps focus both airflow and flame in the center of fire pit 2. Outer sidewall 42 is provided in three sections that abut outer leg portions 20. An L-shaped portion 54 at each end of the outer sidewall section abuts the side and rear of upper leg portion 20 to provide areas that are welded or otherwise fastened to upper leg portion 20 to create a rigid structure. Each outer sidewall section is located between two legs 8 and each leg is between two outer sidewall sections. Taken together, the three outer sidewall sections form a right cylinder with their upper edges connected to or located adjacent the underside of flange 10. In the exemplary configuration, inner sidewall 40 is also in the form of a right cylinder but is formed from a single piece of metal.

Upper leg portions 20 are rectangular tubes with vertically-slotted inner walls facing inner sidewall 40. Upper leg portions 20 have top edges connected to or located adjacent to the underside of flange 10. Upper leg portions 20 are connected to inner sidewall 40 with brackets 60 that angle the lower ends of upper leg portions 20 outwardly to create a tripod arrangement for legs 8 to provide stability to fire pit 2. Portions of upper leg portions 20 are disposed between the locations of sidewalls 40 and 42 when viewed down in section from above. In addition to brackets 60, upper leg portions 20 engage the outer ends 62 of the air inlet manifold 64. Outer sidewall 42 lateral edges (L-shaped ends 54) engage the sides and inner wall of outer leg portions 20. In another configuration, outer leg portions 20 are located outwardly of outer sidewall 42 and are not angled outwardly.

Lower leg portions 22 are hollow rectangular tubes that define an inner wall defined by flanges 66. A bottom flange 66 is located lower than the sidewalls of lower leg portion 22 and lower than inner flange 66 lower edges and provides a smooth foot that minimizes the chances of scratching a support surface such as a deck.

A handle 70 is mounted to one of legs 8 in alignment with the center of gravity of fire pit 2 (when legs 8 are in the storage position) so that fire pit 2 hangs in a stable condition as shown in FIG. 5 when carried by handle 70. A reference plane that contains the center of gravity of fire pit 2 and is perpendicular to sidewall 6 passes through handle 70. Handle 70 is thus about halfway between the upper and lower edges of sidewall 6 but closer to bottom wall 4. Handle 70 allows a single person to transport fire pit 2 by carrying fire pit 2 with a single arm by the person's side like a suitcase. The weight of fire pit 2 can be under 35 pounds to make it possible for most people to carry it with one arm. Handle 70 can be moved between its own operational position as shown in FIGS. 1-3 and 5 and a stored position as shown in FIG. 6 where it pivots down with respect to outer leg portion 20 to be out of the way and to reduce the likelihood that someone walking past fire pit 2 will impact a shin on handle 70. Handle can define a bottle opener. Handle 70 includes a grip that is supported by two arms. The two arms are perpendicular to sidewall 6 when handle 70 is in the operational position and the two arms are parallel to outer leg portion 20 when handle 70 is in the stored position.

Air inlet manifold 64 includes three arms 72 with their inner ends connected together. The outer ends extend through inner sidewall 40. Bottom wall 4 defines a central support 74 below the inner ends of arms 72. Bottom wall 4 defines elongated openings 76 under a majority of the length of each arm 72. Openings 76 are elongated rectangles that match the width of arms 72 extend over at least fifty percent of the length of each arm 72. Air inlet manifold 64 evenly distributes inlet air to the fire while limiting clogging from ash. Each arm 72 defines a plurality of spaced air inlets 78 along the length of the top portion of arm 72. Each air inlet 78 is directly above a portion of an elongated opening 76. Air inlets 78 are raised up above the upper surface of bottom wall 4 to limit clogging by ash formed by burning fuel. Each air inlet 78 is formed by bending a portion of the sidewall of arm 72 upwardly which provides an overhang to limit the entrance of ash into open arm 72. Arm ends 62 are in fluid communication with the interior of legs 8 and air inlets 48. The plurality of spaced air inlets 78 evenly distribute inlet air below the fire.

Brackets 80 support bottom wall 4 from outer leg portions 20. Brackets 80 also carry a heat shield 82 that is spaced below bottom wall 4 to define a chamber below the fire box. Heat shield 82 defines air inlets 48 but otherwise provides a continuous surface between bottom wall 4 and the support surface upon which fire pit 2 is supported. The combination of the spacing provided by inner leg portions 22 being extended to the campfire position and the protection provided by heat shield 82, fire pit 2 can be used on a wide variety of deck surfaces and won't immediately kill grass under the pit. Air inlets 46 also allow heat to escape from the chamber above heat shield 82. Positioning air inlets 48 only about the outer perimeter portion of heat shield 82 limits the amount of heat that is experienced by the support surface under fire pit 2. Air inlets 48 are positioned in the outer twenty percent near the perimeter of heat shield 82 to leave the central portion solid.

Accessory post 12 can be selectively carried by and removed from fire pit 2. Accessory post 12 can be used to support a cooking grill or a hook for a hanging pot or for supporting a pot and winch assembly. When using accessories such as a grill, it is desired that accessory post 12 is locked in place and does not rotate with respect to main body 4. In this configuration, the bottom portion of accessory post is inserted through flange 10 and into a post support sleeve 90 secured to fire pit 2 inside air supply duct 44. Sleeve 90 receives post 12 in a sliding relationship that allows post to slide in and out of sleeve 90 but limits lateral movement. The lower end of accessory post 12 is disposed inside sleeve 90, extends below sleeve 90, or extends all the way down and engages heat shield 82. When locked in place, one or more locking projections 92 engage one or both of sidewalls 40 and 42 to lock the rotational position of post 12 with respect to fire pit 2. Locking projections 92 sit on top of sleeve 90. Locking projection 92 is also disposed under flange 10 so post 12 cannot be unintentionally lifted while in use.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the above description and attached illustrations are an example and the invention is not limited to the exact details shown or described. Throughout the description and claims of this specification the words "comprise" and "include" as well as variations of those words, such as "comprises," "includes," "comprising," and "including" are not intended to exclude additives, components, integers, or steps.

The invention claimed is:

1. A fire pit comprising:
a bottom wall and a sidewall that define a fire box inward of the sidewall and above the bottom wall;
the sidewall having an upper edge and a lower edge;
a flange located at and engaging the upper edge of the sidewall;
the flange having an overhanging portion above the fire box; and
an angled wall positioned between and engaging the sidewall and the overhanging portion of the flange to define an airflow cone at a top of the fire box.

2. The fire pit of claim 1, wherein the sidewall includes an inner sidewall spaced from an outer sidewall to define an airflow channel; the inner sidewall defining upper air outlets; the angled wall being connected to the inner sidewall above the upper air outlets.

3. A fire pit comprising:
a bottom wall and a sidewall that define a fire box inward of the sidewall and above the bottom wall;
the sidewall including an inner sidewall spaced from an outer sidewall to define an airflow channel;
at least three telescoping legs; each telescoping leg having an upper leg portion and a lower leg portion;
portions of each of the upper leg portions being located between the locations of the inner sidewall and the outer sidewall;
the lower leg portion of each leg being selectively movable with respect to the upper leg portion between storage and extended positions; and
when in the storage position, a portion of the lower leg portion being located between the locations of the inner sidewall and the outer sidewall.

4. The fire pit of claim 3, wherein a majority of the lower leg portions are inside the upper leg portions when the legs are in the storage position.

5. The fire pit of claim 3, wherein the legs are angled outwardly from the fire box in a tripod configuration.

6. The fire pit of claim 3, wherein each leg has at least one defined adjustment position where a biased locking finger holds the position of the lower leg portion with respect to the upper leg portion.

7. The fire pit of claim 3, further comprising a handle connected to one of the legs.

8. The fire pit of claim 7, wherein the handle is movable between stored and operational positions.

9. A fire pit comprising:
a bottom wall and a sidewall that define a fire box inward of the sidewall and above the bottom wall;
the sidewall having an upper edge and a lower edge;
at least three telescoping legs; each telescoping leg having an upper leg portion and a lower leg portion;
the lower leg portion of each leg being selectively movable with respect to the upper leg portion between a storage position, an extended position, and a fully extended position;
when in the storage position, a majority of the length of each of the lower leg portions are located intermediate the upper and lower edges of the sidewall; and
when in the extended position, at least some of the length of each of the lower leg portions are located at a position that is lower than the lower edge of the sidewall;
when a leg is in the fully extended position, all but a short length of the lower leg portion of the leg is located at a position that is lower than the upper leg portion of the leg; and
when a leg is in the fully extended position, the lower leg portion of the leg is pivotable between a first position parallel to the upper leg portion of the leg and a second position outwardly with respect to the upper leg portion of the leg such that the lower leg portion of the leg is not parallel to the upper leg portion of the leg.

10. The fire pit of claim 9, wherein a majority of the lower leg portions are inside the upper leg portions when the legs are in the storage position.

11. The fire pit of claim 9, further comprising a handle connected to one of the legs.

12. The fire pit of claim 9, wherein essentially the entire lengths of the lower leg portions are located intermediate the upper and lower edges of the sidewall when the legs are in the storage position.

13. The fire pit of claim 9, wherein the essentially the entire lengths of the upper leg portions are located intermediate the upper and lower edges of the sidewall when the legs are in the storage position.

14. The fire pit of claim 9, wherein each leg has at least one defined adjustment position where a biased locking finger holds the position of the lower leg portion with respect to the upper portion.

15. The fire pit of claim 14, wherein the outer leg portion defines an opening that receives a portion of the locking finger when the inner leg portion is moved with respect to the outer leg portion to the defined position.

16. A fire pit comprising:
a bottom wall and a sidewall that define a fire box inward of the sidewall and above the bottom wall;
the sidewall having an upper edge and a lower edge;
at least three telescoping legs; each telescoping leg having an upper leg portion and a lower leg portion;
the lower leg portion of each leg being selectively movable with respect to the upper leg portion between storage and extended positions;
when in the storage position, a majority of the length of each of the lower leg portions are located intermediate the upper and lower edges of the sidewall;

when in the extended position, at least some of the length of each of the lower leg portions are located at a position that is lower than the lower edge of the sidewall;

the sidewall including an inner sidewall spaced from an outer sidewall to define an airflow channel;

a heat shield spaced from and located below the bottom wall; and the outer sidewall defining a plurality of air openings positioned lower than the bottom wall and higher than the heat shield when the fire pit is supported on a support surface by the legs to provide airflow through the sidewall into a space between the bottom wall and the heat shield.

17. The fire pit of claim 16, wherein the outer perimeter portion of the heat shield defines air inlets.

18. The fire pit of claim 17, wherein the inner sidewall defines upper air outlets for the fire box.

* * * * *